(12) United States Patent
Chang et al.

(10) Patent No.: US 6,593,053 B1
(45) Date of Patent: Jul. 15, 2003

(54) METHOD FOR CONTROLLING MELT RHEOLOGY OF RESIN MIXTURES

(75) Inventors: Hui Chang, Pittsford, NY (US); Dongming Li, Fairport, NY (US); Joseph L. Leonardo, Penfield, NY (US); Yelena Lipovetskaya, Rochester, NY (US); Laura A. Williams, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 60 days.

(21) Appl. No.: 09/692,867

(22) Filed: Oct. 23, 2000

(51) Int. Cl.$^7$ .............................. G03G 9/08; G01L 9/12
(52) U.S. Cl. ..................................... 430/137.18; 73/724
(58) Field of Search ...................... 430/137.1, 137.18; 73/724

(56) References Cited

U.S. PATENT DOCUMENTS

| | | | |
|---|---|---|---|
| 4,141,252 A | 2/1979 | Lodge | 73/724 |
| 4,454,765 A | 6/1984 | Lodge | 73/724 |
| 5,376,494 A | * 12/1994 | Mahabadi et al. | 430/137.1 |
| 5,468,586 A | * 11/1995 | Proper et al. | 430/137.1 |
| 5,650,484 A | 7/1997 | Hawkins et al. | 528/481 |
| 6,114,486 A | * 9/2000 | Rowland et al. | 526/352 |
| 6,326,119 B1 | * 12/2001 | Hollenbaugh et al. | 430/137.2 |

* cited by examiner

*Primary Examiner*—John Goodrow
(74) *Attorney, Agent, or Firm*—Robert Thompson

(57) ABSTRACT

A process including: introducing and continuously melt mixing in an extruder a mixture of a first resin feed and a second resin feed; measuring within the extruder the melt rheology of the resulting melt mixture of the first and second resins; determining the relative ratio of the first resin and a second resin from the melt rheology in the resulting melt mixture; and adjusting the relative feed ratio of the first resin and second resin feeds introduced to the extruder.

21 Claims, 2 Drawing Sheets

METHOD FOR CONTROLLING MELT RHEOLOGY OF RESIN MIXTURES

CROSS REFERENCE TO COPENDING APPLICATIONS

Attention is directed to commonly assigned applications: U.S. Ser. No. 09/520,359 now U.S. Pat. No. 6,326,119, filed Mar. 7, 2000, entitled "TONER AND DEVELOPER PROVIDING OFFSET LITHOGRAPHY PRINT QUALITY," discloses a method of forming a toner having controlled properties for use in a developer composition finding particular use in a hybrid scavengeless development scheme includes feeding at least one binder and at least one colorant into a mixing device at a feed ratio, upon exit of the mixture from the mixing device, monitoring one or more properties of the mixture with at least one monitoring device, wherein if the monitoring indicates that the one or more properties being monitored is out of specification, removing the monitored mixture from the method and adjusting the feed ratio by adjusting the feeding of the at least one binder or of the at least one colorant, thereby retaining in-specification mixture in the method, grinding the in-specification mixture, optionally together with a portion of one or more external additives to be added to the mixture, classifying the ground in-specification mixture, and mixing the classified in-specification mixture with one or more external additives to obtain the toner having controlled properties. Use of the toner obtained in a developer in a hybrid scavengeless development apparatus enables images to be achieved with properties similar to that achieved in offset lithography.

In U.S. Ser. No. 09/520,437 now U.S. Pat. No. 6,242,145, filed Mar. 7, 2000, entitle "TONER AND DEVELOPER PROVIDING OFFSET LITHOGRAPHY PRINT QUALITY" there is disclosed a developer of a mixture of carrier particles and toner particles containing at least one binder, at least one colorant, and optionally one or more additives, has a triboelectric value of from 35 to 60 $\mu C/g$, a charge distribution (Q/D) of from −0.5 to −1.0 fC/micrometer and the distribution is substantially unimodal and possesses a peak width of less than 0.5 fC/micrometer, preferably less than 0.3 fC/micrometer, and a conductivity of the developer ranges from $1\times10^{-11}$ to $10\times10^{-15}$ mho/cm as measured at 30 V. The carrier particles of the developer preferably have an average particle diameter of 65 to 90 microns and a size distribution wherein 2.0% or less of a total number of carrier particles have a size less than 38 micrometers. The ratio of carrier volume median diameter to toner volume median diameter is about 10:1. The developer finds particular use in devices utilizing hybrid scavengeless development. Use of a developer with such properties in a hybrid scavengeless development apparatus enables images to be achieved with properties similar to that achieved in offset lithography.

In U.S. Ser. No. 09/520,361 now U.S. Pat. No. 6,248,496, filed Mar. 7, 2000, entitled "METHOD OF REPLENISHING DEVELOPER IN A HYBRID SCAVENGELESS DEVELOPMENT SYSTEM," there is disclosed a replenisher material of toner particles and carrier particles, wherein a replenisher ratio of the toner particles to the carrier particles in the replenisher is determined as a function of at least one property of the developer and at least one operational property of an apparatus for developing an electrostatic latent image recorded on an image receiving member, and wherein the apparatus includes a housing defining a chamber having a supply of developer comprised of toner particles and carrier particles therein, a donor member spaced from the image receiving member and adapted to transport toner particles of the developer from the chamber to a development zone adjacent the image receiving member, at least one wire positioned in the development zone between the image receiving member and the donor member, a voltage supply for electrically biasing the at least one wire during a developing operation with a current to detach toner particles from the donor member, forming a cloud of toner particles in the development zone, and developing the latent image with toner particles from the cloud, and at least one dispenser for dispensing replenisher comprised of toner particles and carrier particles into the chamber, wherein a replenisher ratio of the toner particles to the carrier particles in the replenisher is determined as a function of at least one property of the developer and at least one operational property of the apparatus. The replenisher ratio is preferably determined as a function of the tribo stability of the developer in a non-replenishment mode of the apparatus and/or as a function of the conductivity of the developer in a non-replenishment mode of the apparatus.

The disclosures of each the above mentioned copending applications are incorporated herein by reference in their entirety. The appropriate components and processes of these patents may be selected for the toners and processes of the present invention in embodiments thereof.

BACKGROUND OF THE INVENTION

This invention relates generally to apparatus and method for controllably and accurately melt mixing, for example in an extruder, two or more resin materials to produce a product with a desired combination of properties. More specifically the present invention relates to an apparatus and method for controllably and accurately melt mixing a mixture of two or more resins, in real-time, while continuously monitoring the melt rheology properties of the melt mixture, such as the viscosity, the elasticity, or both, and adjusting, if necessary, the ratio of feed mixture resin materials, so that the resulting product mixture will possess highly specific and desirable properties, for example, a narrow glass transition temperature ($T_g$) range, melt viscosity and elasticity, a narrow image gloss value within a wide range of possible gloss values, and wherein the fuser roll life is enhanced or extended. The invention, in embodiments, can be accomplished by combining in an extruder apparatus, a mixture of two or more thermoplastic resins, or related resin materials, including cross-linked resin or resin blends, and continuously monitoring the melt rheology of the resulting mixture in the extruder. The apparatus and method of the present invention, alternatively or additionally, solves several problems and provides various advantages including, for example: co-feeding toner reclaim fines to minimize the variation of toner rheology associated with different lots of resin feed or reclaim materials and for different concentrations of toner reclaim fines.

Problems associated with controlling melt mixture rheology, and the properties of the melt blend can depend, for example, upon the desired or required properties of the resultant mixture, for example, a toner imaging material.

Toner is the image-forming material in a developer which when deposited by the field of an electrostatic charge becomes the visible record. There are two different types of developing systems known as one-component and two-component systems. In one-component developing systems, the developer material is toner comprised of particles of magnetic material, usually iron, embedded in a black plastic resin. The iron enables the toner to be magnetically charged and developed. In two-component systems, the developer material is comprised of toner of polymer or resin particles and a colorant, and a carrier of roughly spherical particles or beads usually made of steel. An electrostatic charge between the toner and the carrier bead causes the toner to cling to the carrier in the development process and to be subsequently transferred to a charged latent image on an imaging member such as a photoreceptor.

PRIOR ART

In U.S. Pat. No. 5,650,484, issued, Jul. 22, 1997; to Hawkins, et al., there is disclosed an apparatus for the preparation of a mixture of toner resin and initiator, to form a toner resin or toner mixture including cross-linked micro-gel particles is provided. The apparatus includes a toner extruder having the resin being conveyed therethrough and an adder for adding the initiator to the toner resin in the toner extruder to form the toner resin or mixture. The apparatus also includes a measurer for measuring the cross-linked micro-gel particles in the toner mixture substantially immediately after mixing in the toner extruder and transmitting a signal indicative of the quantity of cross-linked micro-gel particles in the toner resin or mixture. The apparatus also includes a controller for controlling the addition rate of initiator in response to the signals from the measurer.

Other references of interest include: U.S. Pat. Nos. 4,141,252 and 4,454,765, which disclose a devices for measuring melt rheological properties of, for example, resin and resin mixtures, and as discussed below.

There remains a need for simple, efficient, safe, economical, and highly reliable and reproducible method and apparatus for monitoring, analysis, and real-time manipulation of the in situ, that is within the extruder or melt mixing device itself, melt rheological properties of a blend of two or more resin constituents, for example in a toner extrusion process, and the like industrial or specialty formulations.

SUMMARY OF THE INVENTION

Embodiments of the present invention, include:

Overcoming or minimizing problems encountered in the art by providing melt mixing process equipment and methods, which enable improved manufacturing efficiency and improved reliability of the properties of the resulting melt blended resin materials;

A process comprising:
introducing and continuously melt mixing in an extruder a mixture of a first resin feed and a second resin feed;
measuring within the extruder the melt rheology of the resulting melt mixture of the first and second resins;
determining the relative ratio of the first resin and a second resin from the melt rheology in the resulting melt mixture; and
adjusting the relative feed ratio of the first resin and second resin feeds introduced to the extruder; and A process comprising:
continuously melt mixing a mixture of two or more feed resins in an extruder;
continuously measuring the melt rheology in viscosity or elasticity of the resulting resin melt mixture within the extruder;
continuously computing the relative ratio of the resulting resin mixture from the measured melt rheology; and
altering the relative ratio of the feed resins introduced to the extruder if the relative ratio of the resins in the resulting melt mixture, as measured by the melt viscosity or elasticity of the mixture near the extruder exit port, deviates from a predetermined melt viscosity of, for example, about 2,400 poise at 30 sec−1 per 125° C. by more than about 40 to about 45 units as measured by a Goettfeit viscometer, and melt elasticity of, for example, 3,100 dynes/cm$^2$ per 135° C. by more than about 75 to about 80 units as measured by a Lodge Stressmeter®.

These and other aspects are achieved, in embodiments, of the present invention as described and illustrated herein.

BRIEF DESCRIPTION OF THE DRAWINGS

Other features of the present invention will become apparent as the following description proceeds and upon reference to the drawings, in which.

DETAILED DESCRIPTION OF THE INVENTION

Figure 1:
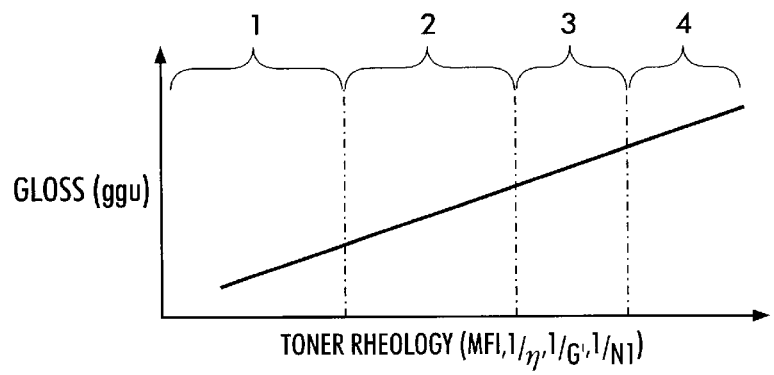
FIG. 1 illustrates in embodiments the relationship between various measured toner rheology parameters and the observed toner gloss.

In embodiments the present invention provides a process comprising:
introducing and continuously melt mixing in an extruder a mixture of a first resin feed and a second resin feed;
measuring within the extruder the melt rheology of the resulting melt mixture of the first and second resins, and optionally wax, toner fines, and pigments;
determining the relative ratio of the first resin and a second resin from the melt rheology in the resulting melt mixture; and
adjusting the relative feed ratio of the first resin and second resin feeds introduced to the extruder.

In embodiments, the melt rheology can be the viscosity($\eta$) of the resulting melt mixture of the first resin and second resin as measured within the extruder near the exit port of the extruder and can be, for example, from about 2,000 to about 4,000 poise at 30 sec$^{-1}$ per 125° C.

In embodiments, the melt rheology can be the elasticity (N1) of the resulting melt mixture of the first resin and second resin as measured within the extruder near the exit port of the extruder and can be, for example, from about 900 to about 10,000 dynes/cm$^2$ per 135° C., preferably from about 1,000 to about 8,000 dynes/cm$^2$ per 135° C., and more preferably from about 1,100 to about 5,000 dynes/cm$^2$ per 135° C.

The first resin feed and a second resin feed are preferably introduced into the extruder in a predetermined ratio, for example, of from about 10:1 to about 1:10, and preferably from about 5:1 to about 1:5, and at a constant but broad range of feed rates, such as from about 1 gram per minute to about 500 kilograms per minute of the respective resin feeds, for example on a production scale of about 400 pounds per hour of the first resin and about 90 pounds per hour of the second resin such as a 20 percent gel content material.

Measuring of the melt rheology is accomplished continuously and near and within the exit port end of an extruder barrel. The rheology measurements of the melt viscosity or elasticity can accomplished with a variety of known rheometers. Examples of suitable rheometers include the known Goettfeit viscometer and the Lodge Stressmeter®. The Goettfeit viscometer is a viscosity measurement device, which includes a single pressure transducer probe on a capillary die. With a Goettfeit viscometer the toner melt is pumped through the capillary die by a gear pump in order to keep a constant flow rate and temperature. From the pressure and flow rate measurements the viscosity($\eta$) of the melt for a given shear rate and temperature is determined. A preferred measure of melt rheology is accomplished with the Lodge Stressmeter® which measures non-linear viscoelasticity or first normal stress difference(N1) which is known to be proportional to the hole pressure error. The Lodge Stressmeter® is commercially available for Bannatek Co., and is a slit-die type rheometer, reference for example, "Normal Stress Differences from Hole Pressure Measurements", by A. S. Lodge, Chapter 10, in "Rheological Measurement, 2nd Ed., Edited by A. A. Collyer and D. W. Clegg, Chapman & Hall, London 1998, ISBN 0 412 72030 2, and U.S. Pat. Nos. 4,141,252 and 4,454,765, the disclosures of which are incorporated by reference herein in their entirety, and which Stressmeter® measures the first normal stress difference (N1) and the viscosity of toner melt in steady shear flow, for example, while on-line, using three different pressure transducers in the rheometer probe.

Determining the relative ratio of the first resin and a second resin from the melt rheology in the resulting melt mixture can be accomplished by comparing the measured or observed elastic rheology with an elastic rheology reference standard curve, for example, stored in a programmable computer that relates the measured viscosity or elasticity to the ratio of the first and second resins over a range of resin ratios and temperatures. Adjusting the relative ratio of the first resin and second resin feeds which produce the resulting melt mixture can be accomplished by transmitting a signal from a programmable computer, which can include for example, a data processing unit, control unit, and a transmitting unit, to a servo-motor controller situated on either or both the valving and flow controls of the first resin feed and second resin feed sources. The aforementioned U.S. Pat. No. 5,650,484, is of interest and discloses measuring and transmitting from a spectroscope a signal, for example, indicative of the quantity of cross-linking in the micro-gel resin.

The melt mixing of the resin mixture in the extruder is preferably accomplished continuously, that is, for continuity and productivity purposes.

The first resin is preferably a linear or uncross-linked polymer or copolymer comprised of monomers such as styrene compounds, diene compounds, acrylate compounds, mixtures of diacid compounds and diol compounds, and the like materials, and mixtures thereof. A particularly preferred first resin is the polymeric esterification product or products of one or more dicarboxylic acid compounds and a diol such as a diphenol or a bis-phenol. Particularly preferred bis-phenol compounds are propoxylated bis-phenols and most preferably propoxylated bis-phenol A. A particularly preferred dicarboxylic acid compound is fumaric acid.

The second resin can be, for example, a cross-linked polymer or copolymer obtained from the above described first resin with gel content, for example, in an amount of from about 10 to about 90 weight percent based on the total amount of the second resin. A particularly preferred second resin is a cross-linked first resin comprised of a polymeric esterification product of a dicarboxylic acid compound such as fumaric acid and a propoxylated bis-phenol A which cross-linked polymer product has a gel content in an amount of from about 10 to about 40 weight percent based on the total weight of the second resin. An even more preferred second resin is the foregoing cross-linked resin with a gel content of from about 30 to about 35 weight percent based on the total weight of the second resin. Alternatively, in embodiments a result comparable to the foregoing more preferred result can be achieved using a lower weight percentage of the cross-linked second resin where the molecular weight range of the first resin is lower, for example, less than about 20,000 molecular weight units, such as from about 10,000 to about 20,000 units. The second resin can be a polymer or copolymer comprised of monomers, much like the first resin, such as compounds, diene compounds, acrylate compounds, mixtures of diacid and diol compounds, and the like materials, and mixtures thereof, and wherein the second resin can be chemically and physically different from the first resin.

In embodiments, the preparative process of the present invention can further comprise isolating, washing, and comminuting the resulting resin mixture. In other embodiments, the present invention can further comprise feeding one or more colorants along with the first and second resin feeds. The colorants can be, for example, dyes, pigments, and mixtures thereof, including colorant predispersions or "flushed colorants" known in the art, for example, pigments which are dispersed in a resin for convenient handling, further processing, and for obtaining superior dispersions with superior stability. In other embodiments, the present invention can further comprise feeding one or more recycled or reclaimed resin or toner particle feeds of known composition along with the first and second resin feeds. The recycled or reused resin or toner fines feed can be in an amount of from about 0.1 to about 40 weight percent of the total weight of the feed materials.

The resulting mixture resin mixtures or resin and pigment mixtures can provide a toner compositions with a gloss characteristic of from about 30 to about 80 Gardner Gloss Units(ggu), preferably from about 40 to about 60 Gardner Gloss Units, and more preferably from about 50 to about 60 Gardner Gloss Units as measured, for example, using a near infrared source in transmittance mode.

The temperatures within the extruder during mixing and extruding the resin and pigment materials can be adjusted with an internal or external heater or equivalent heating means, including on-line real time feedback capability, to maintain a temperature within a range of from about 90 to about 120° C., preferably from about 100 to about 115° C., and more preferably from about 105 to about 110° C. An extruder barrel temperature profile can be, for example: Zones 1 and 2 at about 70° C.; Zones 3 to 12 at about 90° C.; Zone 13 and 14 at about 140° C., reference the above mentioned FIG. 2 which provides a representative or exemplary indication of the extruder zones from left near the inlet port to right near the outlet port.

In embodiments of the present invention there is provided a process comprising:

continuously melt mixing a mixture of two or more feed resins in an extruder;

continuously measuring the melt rheology in viscosity or elasticity of the resulting resin melt mixture within the extruder;

continuously computing the relative ratio of the resulting resin mixture from the measured melt rheology; and altering the relative ratio of the feed resins introduced to the extruder if the relative ratio of the resins in the resulting melt mixture, as measured by the melt viscosity or elasticity of the mixture near the extruder exit port, deviates from a predetermined melt viscosity of, for example, 3,245 poise at 30 sec$^{-1}$ per 125° C. by more than about 40 to about 45 units as measured by a Goettfeit viscometer, and melt elasticity of 3,100 dynes/cm$^2$ per 135° C. by more than about 75 to about 80 units as measured by a Lodge Stressmeter®.

In embodiments of the present invention the preparative process can be advantageously used to prepare high quality toner compositions and developer compositions. The toner and developer compositions of the present invention can be used in imaging processes and apparatuses to prepare high quality xerographic and liquid developed images.

The toners and developers of the present invention when used in conventional imaging processes were unexpectedly found to provide fuser roll life extension, for example, from about 200,000 to about 250,000 impressions for toner gel content of about 5 weight percent, and from about 500,000 to about 550,000 impressions for toner gel content of about 10 weight percent.

Thus when certain of the toner melt rheological properties increase, such as melt viscosity and elasticity, there is observed or realized a corresponding increase in the average fuser roll life, reference the exemplary data tabulated in the table and the working examples. Although not wanting to be limited by theory, it is believed that where there is prepared a melt mix toner composition with a decreased melt index, the resulting finished toner composition produces an increased average fuser roll life. However, the result may in extremes be limited by low gloss concerns.

| Toner MFI (gm/10 mins)       | 7   | 13  | 23  |
|------------------------------|-----|-----|-----|
| Fuser Roll life (kilocopies) | 600 | 400 | 200 |

Referring to the Figures, FIG. 1 illustrates in embodiments the relationship between various measured toner rheology parameters and the observed toner gloss. The point between Region 1 and 2 corresponds to the transition from unacceptable to acceptable printed image gloss properties. The point between Region 2 and Region 3 corresponds to the fuser roll life limit and above which point the fuser roll exhibits rapid deterioration. The point between Region 3 and Region 4 corresponds to the high gloss limit. The following tabulated data is also illustrative of the relation between the melt flow index and the gloss characteristics (in Gardner gloss units or ggu) of the printed images generated from toners made from mixtures of resins.

| MFI (gm/10 mins) | 6  | 11 | 23 |
|------------------|----|----|----|
| Gloss (ggu)      | 40 | 60 | 85 |

Toner or melt mixture rheology can be measured with a variety of metrics including but not limited to for example, melt flow index (MFI, in grams per 10 minutes), viscosity (eta or η, in poise), elasticity or elastic modulus (G' in dynes per centimeter squared), or the first normal stress difference or non-linear elasticity (N1 in dynes per centimeter squared).

Figure 2:
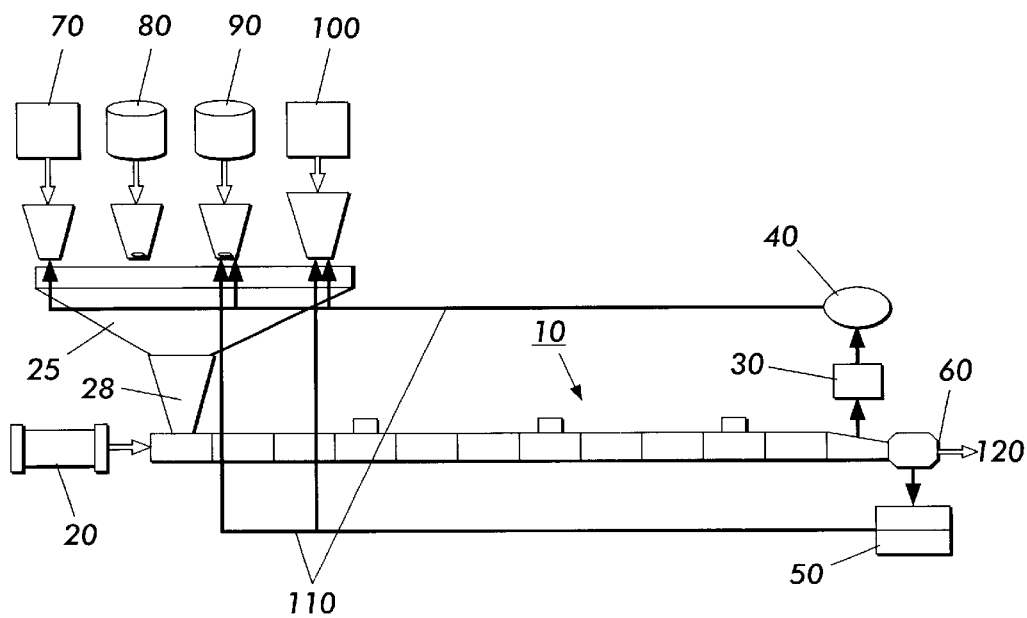
FIG. 2 illustrates in embodiments an extruder apparatus of the present invention for preparing toner blends with the process of the present invention.

FIG. 2 illustrates in embodiments a modified extruder apparatus (10) of the present invention for preparing toner blends with the process of the present invention. An extruder drive motor (20) drives an extruder screw (not shown). Manifold (25) is adapted to receive and direct material feeds to the extruder feed port (28). An on-line rheometer (30) mounted internally, or optionally externally, continuously measures the melt rheology of the resin mixture within the extruder and compares the measured values with predetermined specification set points (40) stored, for example, in a look-up table in a programmable computer memory. Similarly, and optionally, an on-line infrared detector (60) which is sensitive, for example, to the near infrared region of the electromagnetic spectrum, can be mounted internally, or optionally externally, to continuously measure the infrared properties of the resin melt mixture within or without the extruder and compares the measured values with predetermined specification set points (50) stored, for example, in a look-up table in a programmable computer memory. The feed components can include, for example, the second resin feed (70) containing for example a gel component, toner fines recycle or reclaim feed (80), pigment or flushed pigment feed (90), and the first resin feed (100) containing for example a linear, unbranched, or uncross-linked resin. The programmable computer and set point comparators (40 and 50) communicate with the foregoing feed reservoirs, for example, by connections comprising a closed loop feedback control circuit (110) such as by hard wire, by equivalent wireless linkages, or by direct mechanical linkages, to servo-motor controllers and associated valving (not shown) for controlling the relative amounts, if any, of each of the feed components delivered to the extruder feed port to maintain the desired proportions of component and to ensure the proper melt rheology and associated performance properties of the melt mixture and of the resultant toner materials. The resulting extrudate exiting the extruder can be further processed (120) by various unit operations, if desired, for example, cooling, quenching, kneading, crushing, grinding, classifying, screening, and the like known post-extrusion preparative unit operations.

Figure 3:
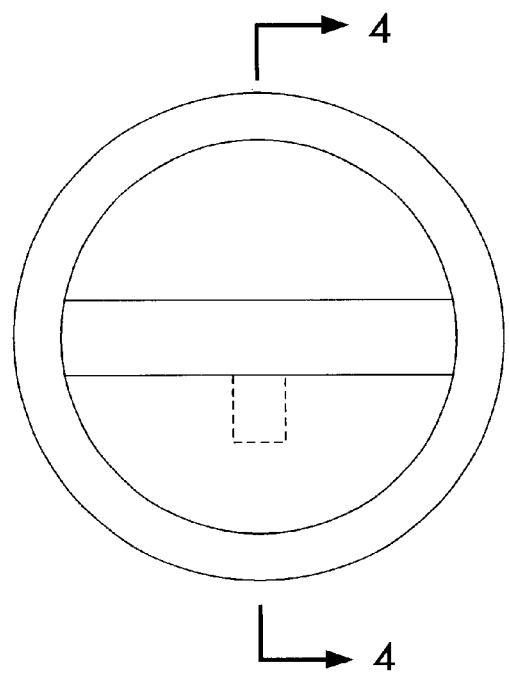
FIGS. 3 and 4 illustrate in embodiments cross-section views of the barrel region of the extruder apparatus of the present invention showing an on-line rheometer disposition within the extruder.

FIG. 3 illustrates a cross-section view of the Stressmeter cavity (30) of the extruder of FIG. 2.

Figure 4:
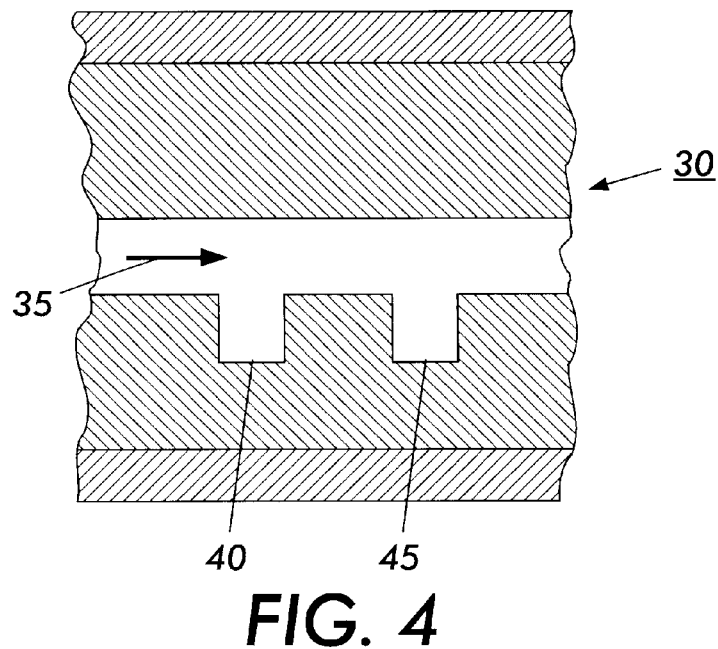

FIG. 4 is a second section view of the barrel region of the extruder apparatus of FIG. 2 showing an in-situ, that is wherein the rheometer is situated within the extruder barrel, on-line rheometer for measuring melt mixture elasticity, and is preferably situated close to the extruder exit port. Thus for example a Lodge Stressmeter cavity (30) within the extruder barrel accommodates a continuous melt mixture directional flow (35) from the feed port toward the exit port, a first slit-die (40) and a second slit-die (45), and associated sensors or transducers for measuring, for example, flow rates, pressures, and the like, see for example, the aforementioned Lodge article in "Rheological Measurements" and the pertinent cited references therein for additional design details.

It should be readily appreciated by one of ordinary skill in the art that the invention is well suited for melt blending mixtures of other powders and particulate materials, for example thermoplastic resins, including a variety of additives, and the like materials. The present invention is believed to be applicable to many melt mixable feed materials, including but not limited to resins, polymers, food stuffs, such as, bread, cookie and doughnut doughs, building materials, and the like pliable or masticable materials.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

The following example illustrates the effect of change of the resin ratio on the resulting toner melt mixture viscosity. As an example, a magenta toner was processed on a known ZSK40SC extruder. The total material throughput was about 200 pounds per hour. The pigment concentrate was held constant at about 15.7 percent or about 31.4 pounds per hour, with the first and second resins making up the material balance. The ratio of the first resin to the second resin was initially set at 1.41:1.0, and the resulting toner melt mixture viscosity was about 2,270 poise at 125° C. and 30 sec$^{-1}$. To increase the viscosity of the toner melt mixture, one can simply increase the feed rate of the cross-linked gel component contained in the second resin. By increasing the feed rate of the second resin and reducing the feed rate of the first resin to a resin ratio of 1.19:1.0, the resulting toner melt mixture viscosity was increased to about 2,490 poise at 125° C. and 30 sec$^{-1}$. Alternatively, to lower the viscosity of the toner melt mixture, one can simply reduce the feed rate of the cross-linked gel component contained in the second resin. By increasing the first resin and reducing the second resin to the initial resin ratio of 1.41, the resulting toner viscosity was decreased to 2,220 poise at 125° C. and 30 sec$^{-1}$. The example furthered illustrates that by setting the resin ratio to a lower value of about 1.19:1.0, the viscosity of the toner melt mixture was again increased to 2,510 poise at 125° C. and 30 sec$^{-1}$.

The ratio of the first to second resin is a controlling factor of toner melt mixture viscosity. Adjusting the resin ratio, one can reach desired toner viscosities. For an exemplary magenta toner, the satisfactory viscosity range is for example, about 2,400±300 poise at 125° C. and 30 sec$^{-1}$, and a preferred viscosity range is about 2,400±200 poise at 125° C. and 30 sec$^{-1}$.

EXAMPLE II

EXTRUSION OF RESIN MIXTURE PRODUCING INTERMEDIATE MELT VISCOSITY AND GLOSS A cyan toner was processed on a ZSK40SC extruder. The total throughput was about 200 pounds per hour. The pigment concentrate was held constant at 3.3 weight percent of pigment or 22.1 pounds per hour, with the first and second resins making up the material balance. The ratio of the first resin to the second one was initially set at about 1.41:1.0, and the resulting toner melt mixture viscosity was about 2,414 poise at 125° C. and 30 sec$^{-1}$. To decrease or increase the viscosity of the toner melt mixture, one simply decreases and increases, respectively, the feed rate of the cross-linked gel component contained in the second resin. The example shows that by decreasing and increasing the feed rate of the second resin, and increasing or decreasing the feed rate of the first resin to second resin ratios of 2.35/0.88/0.47, the resulting toner melt mixture viscosities were decreased or increased to 1,448/3,862/7,242 poise at 125° C. and 30 sec$^{-1}$. The melt flow indices (MFIs) of these toners were 17/13/11/6 grams/10 minutes with 2.16-Kg weigh at 117° C. The glosses of the prints made from these toners at 360° F. were 74/67/59/45 ggu respectively.

EXAMPLE III

EXTRUSION OF RESIN MIXTURE PRODUCING LOW OR REDUCED MELT ELASTICITY AND INTERMEDIATE GLOSS Yellow/black/magenta/cyan toners were processed on a ZSK40SC extruder. The total throughput was 200 pounds per hour. The pigment concentrates were held constant at 8.0/5.0/4.7/3.3 percent, respectively. The feed rate of pigments was 37.6/28.2/22.1/15.5 pounds per hour, respectively, with the first and second resins made up the material balance. The ratio of the first resin to the second resin was initially set at 1.41:1.0, and the resulting toner melt mixture normal stress difference was 1,786 dynes/cm$^2$ at 135° C. and 1.0 sec −1. To decrease or increase the normal stress differences of the toner melt mixture, one can simply decrease or increase the feed rate of the second resin which provides a corresponding decrease or increase in the cross-linked gel component contained in the second resin. As the example shows, decreasing or increasing the feed rate of the second resin, and increasing or decreasing the feed rate of the first resin to second resin ratios of 0.75/1.30/2.01, the resulting toner melt mixture normal stress differences were increased/decreased accordingly to 10,645/3,147/906 dynes/cm$^2$ at 135° C. and 1.0 1/s. The melt flow indices of these toners were 6.9/11.5/13.2/14.7 grams/10 minutes with 2.16-Kg weight at 117° C. The glosses of the prints made from these toners at 360° F. were 39/52/62/69 ggu respectively.

Other modifications of the present invention may occur to those skilled in the art based upon a review of the present application and these modifications, including equivalents thereof, are intended to be included within the scope of the present invention.

What is claimed is:

1. A process for preparing a toner resin comprising:
   introducing and melt mixing in an extruder a mixture of a first resin feed and a second resin feed;
   measuring within the extruder the melt rheology of the resulting melt mixture of the first and second resins;
   determining the relative ratio of the first resin and a second resin from the melt rheology in the resulting melt mixture; and
   adjusting the relative feed ratio of the first resin and second resin feeds introduced to the extruder as measured by the melt rheology.

2. A process in accordance with claim 1, wherein the melt rheology is the viscosity($\eta$) of the resulting melt mixture of the first resin and second resin exiting the extruder and is from about 2,000 to about 4,000 poise at 30 sec$^{-1}$ per 125° C.

3. A process in accordance with claim 1, wherein the melt rheology is the elasticity(N1) of the resulting melt mixture of the first resin and second resin exiting the extruder and is from about 900 to about 10,000 dynes/cm$^2$ per 135° C.

4. A process in accordance with claim 1, wherein the first resin feed and a second resin feed are introduced to the extruder in a predetermined ratio of from about 10:1 to about 1:10 and a feed rate of from about 1 gram per minute to about 500 kilograms per minute of the respective resin feeds.

5. A process in accordance with claim 1, wherein the measuring of the melt rheology is accomplished continuously and near the exit port end of the extruder barrel.

6. A process in accordance with claim 1, wherein the measuring of the melt rheology is accomplished with a rheometer.

7. A process in accordance with claim 1, wherein determining the relative ratio of the first resin and a second resin from the melt rheology in the resulting melt mixture is accomplished by comparing the measured elasticity rheology with an elasticity rheology reference standard curve stored in a programmable computer that relates the measured elasticity or viscosity to the ratio of the first and second resins over a range of resin ratios and temperatures.

8. A process in accordance with claim 1, wherein adjusting the relative ratio of the first resin and second resin feeds which produce the resulting melt mixture is accomplished by transmitting a signal from a programmable computer to a servo-motor controller situated on either or both of the first resin feed and second resin feed sources.

9. A process in accordance with claim 1, wherein the melt mixing is accomplished continuously.

10. A process in accordance with claim 1, wherein the first resin is a polymer or copolymer comprised of monomers selected from the group consisting of styrene compounds, diene compounds, acrylate compounds, mixtures of diacid compounds and diol compounds, and mixtures thereof.

11. A process in accordance with claim 10, wherein the second resin comprises the a cross-linked first resin with a gel content in an amount of from about 10 to about 90 weight percent based on the total amount of the second resin.

12. A process in accordance with claim 11, wherein the second resin is a polymer or copolymer comprised of monomers selected from the group consisting of styrene compounds, diene compounds, acrylate compounds, mixtures of diacid and diol compounds, and mixtures thereof, and wherein the second resin is chemically and physically different from the first resin.

13. A process in accordance with claim 1, further comprising isolating, cooling, and comminuting the resulting resin mixture.

14. A process in accordance with claim 1, further comprising feeding one or more colorants along with the first and second resin feeds.

15. A process in accordance with claim 14, wherein the resulting mixture provides a toner compositions with a gloss characteristic of from about 30 to about 80 Gardner Gloss Units as measured using a near infrared source in transmittance mode.

16. A process in accordance with claim 1, further comprising feeding recycled or reused toner fines along with the first and second resin feeds in an amount of from about 0.1 to about 40 weight percent of the total weight of the feed.

17. A process in accordance with claim 1, further comprising adjusting the temperature of the extruder to maintain a temperature within a range of from about 90 to about 120° C.

18. A process for preparing a toner resin comprising:
continuously melt mixing a mixture of two or more feed resins in an extruder;
continuously measuring the melt rheology in viscosity or elasticity of the resulting resin melt mixture within the extruder;
continuously computing the relative ratio of the resulting resin mixture from the measured melt rheology; and
altering the relative ratio of the feed resins introduced to the extruder when the relative ratio of the resins in the resulting melt mixture, as measured by the melt viscosity or elasticity of the mixture near the extruder exit port, deviates from a predetermined melt viscosity of 2,400 poise at 40 radians per second per 156° C. by more than about 40 to about 45 units as measured by a Goettfeit viscometer, or a melt elasticity of 5,450 poise per $sec^{-1}$ per 135° C. by more than about 75 to about 80 units as measured by a slit-die type rheometer.

19. A toner composition prepared in accordance with claim 1.

20. A developer composition comprising the toner of claim 19 and a carrier.

21. An imaging apparatus with a developing station which develops with a developer in accordance with claim 20, wherein the toner provides fuser roll life extension of from about 200,000 to about 250,000 impressions for a toner gel content of about 5 weight percent, and from about 500,000 to about 550,000 impressions for toner gel content of about 10 weight percent.

* * * * *